US012725718B2

(12) United States Patent
Sarenac et al.

(10) Patent No.: US 12,725,718 B2
(45) Date of Patent: Sep. 1, 2026

(54) STRUCTURED WAVE GENERATOR AND DEVICE FOR DIFFRACTING A NEUTRON BEAM INTO A STRUCTURED WAVE

(71) Applicant: INCOHERENT VISION INC., Wellesley (CA)

(72) Inventors: Dusan Sarenac, Waterloo (CA); Dmitry Pushin, Toronto (CA)

(73) Assignee: INCOHERENT VISION INC., Ontario (CA)

( * ) Notice: Subject to any disclaimer, the term of this patent is extended or adjusted under 35 U.S.C. 154(b) by 524 days.

(21) Appl. No.: 17/300,329

(22) Filed: Jun. 15, 2023

(65) Prior Publication Data

US 2024/0221969 A1 Jul. 4, 2024

Related U.S. Application Data

(60) Provisional application No. 63/340,990, filed on May 12, 2022.

(51) Int. Cl.
*G21K 1/06* (2006.01)

(52) U.S. Cl.
CPC .................................... *G21K 1/06* (2013.01)

(58) Field of Classification Search
None
See application file for complete search history.

(56) References Cited

U.S. PATENT DOCUMENTS 6,643,065 B1 * 11/2003 Silberman ............ G02B 5/1828 359/569
2003/0107786 A1 * 6/2003 Bablumyan ........ G02B 6/12007 359/3
2009/0135486 A1 * 5/2009 McNulty .................. G21K 1/06 378/43

(Continued)

FOREIGN PATENT DOCUMENTS

JP H07151910 A * 6/1995
JP 2010015874 A * 1/2010

OTHER PUBLICATIONS

H. Rauch et al., "Measurement and characterization of the three-dimensional coherence function in neutron interferometry," Phys. Rev. A 53, 902 (Feb. 1, 1996); https://doi.org/10.1103/PhysRevA.53.902 (Year: 1996).*

(Continued)

*Primary Examiner* — Robert H Kim
*Assistant Examiner* — Alina Kaliszewski
(74) *Attorney, Agent, or Firm* — Norton Rose Fulbright Canada LLP; Reno Lessard

(57) ABSTRACT

There is described a structured wave generator generally having a neutron source generating a neutron beam having a propagation axis and a lateral coherence length extending perpendicular to the propagation axis; and a substrate spaced-apart from the neutron source, the substrate having an array of phase gratings distributed on the substrate for receiving the neutron beam, each phase grating having a body made of a grating material and having a holographic (Continued)

profile, the holographic profile having an in-plane dimension being equal or smaller than the lateral coherence length of the neutron beam, wherein when the neutron beam interacts with the array of phase gratings, at least a portion of the neutron beam diffracts to form a structured wave.

20 Claims, 4 Drawing Sheets

(56) References Cited

U.S. PATENT DOCUMENTS

| | | | | |
|---|---|---|---|---|
| 2011/0255168 | A1* | 10/2011 | Sarrant-Foresti | G02B 5/1847 359/599 |
| 2014/0126029 | A1* | 5/2014 | Fuetterer | G02B 5/32 359/3 |
| 2014/0204463 | A1* | 7/2014 | Harada | G02B 5/1876 359/565 |
| 2014/0252228 | A1* | 9/2014 | McMorran | H01J 37/263 250/311 |
| 2015/0338753 | A1* | 11/2015 | Riepen | H05G 2/0094 250/504 R |
| 2019/0385760 | A1* | 12/2019 | Zijp | G03F 7/70166 |

OTHER PUBLICATIONS

English machine translation for JP-2010015874-A (Year: 2010).*
D.A. Pushin et al., "Far-field interference of a neutron white beam and the applications to noninvasive phase-contrast imaging," Phys. Rev. A 95, 043637 (Apr. 26, 2017); https://doi.org/10.1103/PhysRevA.95.043637 (Year: 2017).*
Dusan Sarenac et al., "Structured neutron waves," Proc. SPIE 10934, Optical, Opto-Atomic, and Entanglement-Enhanced Precision Metrology, 1093425 (Mar. 1, 2019); https://doi.org/10.1117/12.2515469 (Year: 2019).*
Alon Luski et al. , Vortex beams of atoms and molecules. Science373, 1105-1109(2021). DOI:10.1126/science.abj2451 (Year: 2021).*
English machine translation for JP-H07151910-A (Year: 1995).*
Lightbody et al., "Design of novel resonance domain diffractive optical elements," Proc. SPIE 2404, Diffractive and Holographic Optics Technology II, (Apr. 20, 1995); https://doi.org/10.1117/12.207490 (Year: 1995).*
S. Mechahougui and J. Harthong, "Deformation of the modulation profile in phase holographic gratings," Appl. Opt. 34, 7969-7973 (1995). https://doi.org/10.1364/AO.34.007969 (Year: 1995).*
Zanke et al., Fine-tuned profile simulation of holographically exposed photoresist gratings, Optics Communications, vol. 154, Issues 1-3, pp. 109-118, ISSN 0030-4018, https://doi.org/10.1016/S0030-4018(98)00252-1. (Year: 1998).*
Lymarenko et al., "New method of diffraction modeling on liquid crystal amplitude-phase screen with square cell for synthesis of wavefront in 3D image visualization system," Proc. SPIE 5257, Ninth International Conference on Nonlinear Optics of Liquid and Photorefractive Crystals, (Year: 2003)(Dec. 3, 2003); https://doi.org/10.1117/12.545814 (Year: 2003).*
Jesacher et al., "Shadow Effects in Spiral Phase Contrast Microscopy," Phys. Rev. Lett. 94, 233902. DOI: https://doi.org/10.1103/Phys RevLett.94.233902. (Year: 2005).*
Fürhapter et al., "Spiral interferometry," Opt. Lett. 30, 1953-1955 (2005). https://doi.org/10.1364/OL.30.001953 (Year: 2005).*
de Angelis et al., "Digital-holography refractive-index-profile measurement of phase gratings," Appl. Phys. Lett. 88, 111114 (2006). https://doi.org/10.1063/1.2186515 (Year: 2006).*
Janicijevic et al., "Fresnel and Fraunhofer diffraction of a Gaussian laser beam by fork-shaped gratings," https://doi.org/10.48550/arXiv.0806.4123. (Year: 2008).*
Quan et al., "Study on controlling the profile of holographic ion beam etching gratings," Proc. SPIE 7657, 5th International Symposium on Advanced Optical Manufacturing and Testing Technologies: Design, Manufacturing, and Testing of Micro- and Nano-Optical Devices and Systems, 765719 (Year: 2010)(Oct. 22, 2010); https://doi.org/10.1117/12.866035. (Year: 2010).*
Benjamin J. McMorran et al., Supporting Material for Electron Vortex Beams with High Quanta of Orbital Angular Momentum. Science331, 192-195(2011). DOI: 10.1126/science. 1198804 (Year: 2011).*
Sandfuchs et al., "Modelling adapted to manufacturing aspects of holographic grating structures", J. Europ. Opt. Soc. Rap. Public. 11006 Vol 6 (2011). DOI: 10.2971/jeos.2011.11006. (Year: 2011).*
McMorran et al., Electron Vortex Beams with High Quanta of Orbital Angular Momentum. Science 331, 192-195 (2011) .DOI:10.1126/science. 1198804 (Year: 2011).*
Voit et al., Holographic Spectroscopy: Wavelength-Dependent Analysis of Photosensitive Materials by Means of Holographic Techniques. Materials 2013, 6, 334-358. https://doi.org/10.3390/ma6010334. (Year: 2013).*
Hussey et al., "Demonstration of a white beam far-field neutron interferometer for spatially resolved small angle neutron scattering," https://doi.org/10.48550/arXiv.1606.03054. (Year: 2016).*
Sarenac et al., "Holography with a neutron interferometer," Opt. Express 24, 22528-22535 (2016). https://doi.org/10.1364/OE.24.022528. (Year: 2016).*
Sarenac et al., "Three Phase-Grating Moire Neutron Interferometer for Large Interferometer Area Applications", Phys. Rev. Lett. 120, 113201. DOI: https://doi.org/10.1103/PhysRevLett.120.113201 (Year: 2018).*
Majkrzak et al., "On coherence and the transverse spatial extent of a neutron wave packet," https://doi.org/10.48550/arXiv.1911.07974. (Year: 2019).*
Ai et al., "A 3D non-hydrostatic model for wave interactions with structures using immersed boundary method," Computers & Fluids, vol. 186, pp. 24-37, ISSN 0045-7930, https://doi.org/10.1016/j.compfluid.2019.04.005. (Year: 2019).*
Alon Luski, Yair Segev, Rea David, Ora Bitton, Hila Nadler, A. Ronny Barnea, Alexey Gorlach, Ori Cheshnovsky, Ido Kaminer, Edvardas Narevicius, Vortex beams of atoms and molecules, Science Sep. 1, 2021 vol. 373, Issue 6559 pp. 1105-1109.
Charles W. Clark, Roman Barankov, Michael G. Huber, Muhammad Arif, David G. Cory & Dmitry A. Pushin, Controlling neutron orbital angular momentum, Nature vol. 525, pp. 504-506 (2015).
Dusan Sarenac, Connor Kapahi, Wangchun Chen, Charles W. Clark, David G. Cory, Michael G. Huber, Ivar Taminiau, Kirill Zhernenkov, Dmitry A. Pushin, Generation and detection of spin-orbit coupled neutron beams, PNAS 116 (41) 20328-20332.

* cited by examiner

Top View

Top View

Side View 45° tilted

STRUCTURED WAVE GENERATOR AND DEVICE FOR DIFFRACTING A NEUTRON BEAM INTO A STRUCTURED WAVE

FIELD

The improvements generally relate to neutron beams and more specifically to methods and systems for modifying such neutron beams.

BACKGROUND

Neutron beams are used as a unique probe thanks their nanometer-sized wavelengths, magnetic sensitivity, and penetrating abilities stemming from electrical neutrality. As such, neutron beams play a substantial role in characterization of materials and the experimental verification of fundamental physics. Further versatility can be enabled by the coupling of neutron's internal and spatial degrees of freedom, and the advances in neutron interferometry techniques that can exploit the phase degree of freedom of the neutron wavefunction.

Structured waves of light or electrons have become widely used scientific tools. A general class of structured waves is indexed by orbital angular momentum (OAM), in which the wavefunction varies as $e^{il\phi}$, where l is the OAM value and the angle $\phi$ describes the azimuth around the propagation vector. The OAM states manifest a "helical" or "twisted" wavefront, and they have been shown to manifest unique sets of selection rules and scattering cross sections when interacting with matter.

Although existing techniques to produce structured waves from neutron beams have been satisfactory to a certain degree, there remains room for improvement.

SUMMARY

As it may be relatively straightforward to impart a structured wave component to a light beam using refractive and diffractive optics, imparting a structured wave component to neutron beams remains challenging. For instance, the refractive index of a neutron beam within common materials is on the order of $n \approx 1-10^{-5}$. Accordingly, basic optimal elements such as a lenses are not practical as their size would need to be impractically large to significantly deflect or diffract the neutron beams. Moreover, the neutron beams have a spatial coherence of only a few micrometers, as it is typically set by the neutron wavelength, aperture size, and the distance from the aperture to the sample. The imaging of fine details of diffraction is further hindered by the spatial resolution of neutron cameras that can at best be a fraction of a millimeter. Lastly, it is noted that even powerful research reactors produce neutron beams with limited fluence rate.

This disclosure presents methods and systems for diffracting neutron beams into structured waves. More specifically, there is described a structured wave generator and device which can impart any structured wave types to an incoming neutron beam including, but not limited to, an OAM beam, an Airy beam, a Bessel beam and the like. In some embodiments, structured wavefronts of helical shapes dominated by a single OAM value can be obtained.

In accordance with a first aspect of the present disclosure, there is provided a structured wave generator comprising: a neutron source generating a neutron beam having a propagation axis and a lateral coherence length extending perpendicular to the propagation axis; and a substrate spaced-apart from the neutron source, the substrate having an array of phase gratings distributed on the substrate for receiving the neutron beam, the phase gratings having a body made of a grating material and having a holographic profile, the holographic profile having an in-plane dimension being equal or smaller than the lateral coherence length of the neutron beam, wherein when the neutron beam interacts with the array of phase gratings, at least a portion of the neutron beam diffracts to form a structured wave.

In accordance with a second aspect of the present disclosure, there is provided a device for diffracting a neutron beam into a structured wave, the neutron beam having a propagating axis and a lateral coherence length extending perpendicular to the propagation axis, the device comprising: a substrate having an array of phase gratings distributed on the substrate for receiving the neutron beam, the phase gratings having a body made of a grating material and having a holographic profile, the holographic profile having an in-plane dimension being equal or smaller than the lateral coherence length of the neutron beam, wherein when the neutron beam interacts with the array of phase gratings, at least a portion of the neutron beam diffracts to form the structured wave.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
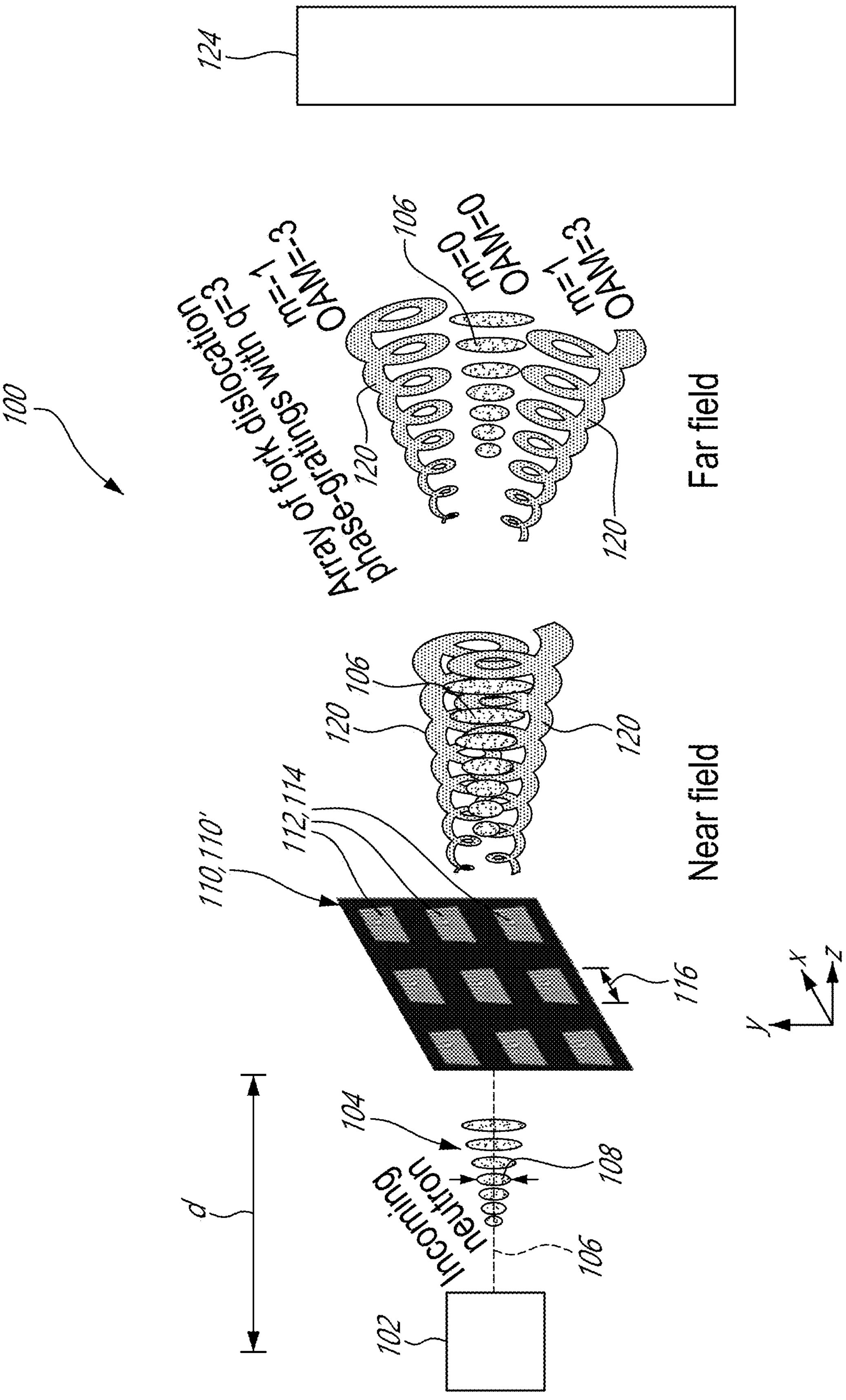
FIG. 1 is a schematic view of an example of a structured wave generator, shown with a neutron source, an array of phase gratings and a neutron detector located in far field, in accordance with one or more embodiments.

FIG. 1 shows an example of a structured wave generator 100 for neutron beams, in accordance with an embodiment. As depicted, the structured wave generator 100 has a neutron source 102 generating a neutron beam having a propagation axis 106 and a lateral coherence length 108 extending perpendicular to the propagation axis 106. Typically, the lateral coherence length 108 of the neutron beam 104 ranges between about 0.1 nm and about 5 μm. The type of neutron source 102 can vary from one embodiment to another and may include small footprint devices such as a spontaneous fission (SF) neutron source, an alpha decay neutron source, a radioisotope neutron source, medium footprint devices such as plasma focus neutron source, light ion accelerator neutron source, or large devices such as nuclear fission reactors, nuclear fusion systems, high-energy particle accelerators and the like. The transverse coherence length 108 of the neutron beam can be defined by the construction of the neutron source 102 including its aperture sizes, the distances between the aperture and the device, neutron guides, and other collimator devices and neutron optics.

As shown, the structured wave generator 100 has a substrate 110 spaced-apart from the neutron source 102 along the propagation axis 106. In some embodiments, the substrate 110 and the neutron source 102 can be spaced apart by a spacing distance d which can vary from several centimeters to several meters.

As depicted, the substrate 110 has an array of phase gratings 112 distributed on the substrate 110 for receiving the neutron beam. Each phase grating 112 has a body 114 made of a grating material. Examples of such grating materials can include, but are not limited to, silicon, aluminium, quartz, nickel, bismuth, and/or various other elements. As shown, each phase grating 112 has a holographic profile. The holographic profile has an in-plane dimension 116 being equal or smaller than the lateral coherence length 108 of the neutron beam 102.

Accordingly, in some embodiments, the in-plane dimension of the holographic profile ranges between about 0.1 μm and about 5 μm. In some embodiments, the in-plane dimension 116 of the holographic profile can be such (e.g., a thickness that corresponds to a IT phase shift) that it suppresses the zero order of the neutron beam 102. For the neutron fluence rates that are available at typical present-day neutron research reactors, the array of phase gratings 112 can include at least 100,000 phase gratings, preferably at least 500,000 phase gratings and most preferably at least 1,000,000 phase gratings. In some embodiments, there can be fewer or more phase gratings. Preferably, the phase gratings 112 are equally spaced-apart from one another along at least one or both the two in-plane axes x and y of the substrate. The phase gratings may all share a common orientation in some embodiments as well. As such, when the neutron beam interacts with the array of phase gratings 112, at least a portion of the neutron beam diffracts to form one or more structured wave(s) 120. The structured wavefronts can be imparted to one or more diffraction orders of the neutron beam. As depicted, the structured wave(s) may overlap with one another in near field only to be spatially separated from one another. The structured wave of neutron can become macroscopic reaching a size of millimetres to centimeters or bigger in the far field. In some embodiments, the structured wave can have uses in near-field, in far-field or in a combination of both. As discussed below, the in-plane shape of the phase gratings define the type of structured wave obtained.

In some embodiments, the structured wave generator 100 can have a neutron detector 124 positioned at the far field. The neutron detector can include a neutron camera configured for producing small-angle neutron scattering (SANS) data which are representative of the amount of neutrons received at different angles from the propagation axis. In some embodiments, a sample receiving area can be provided between the array of phase gratings and the neutron detector. As such, a sample can be probed with neutron beams having structured wavefronts. Accordingly, SANS data may provide information as to the nature of the sample received at the sample receiving area. In some embodiments, reference SANS data may be captured for an empty sample receiving area which may be compared to sample SANS data captured when the sample receiving area contains an actual sample.

It is noted that the holographic profile can be defined by an equation equivalent to the following equation:

$$F(x, y) = A\ \mathrm{sign}\left(\sin\left[\frac{2\pi}{p}x + f(x, y)\right]\right), \tag{1}$$

with F(x,y) denoting the holographic profile, x and y denoting Cartesian coordinates along in-plane axes of the substrate, A denoting a constant factoring in at least on a neutron wavelength λ and groove height h, p denoting a grating period, and f(x,y) denoting a desired structured wavefront. In some embodiments, the constant A is given by $$\frac{-Nb_c\lambda h}{2}$$

where λ denotes the neutron wavelength, $Nb_c$ denotes a coherent scattering length density of the grating material, and h denotes the groove height. In some embodiments, f(x,y) can correspond to qϕ in embodiments where the holographic profile is a fork dislocation phase grating, such as the one shown in FIG. 1, with q denoting a topological charge and ϕ denoting an azimuthal angle.

In some embodiments, the grating period p can range between about 50 nm and about 5 μm. It is noted that the topological charge q can possess any value in principle, but is practically bounded to between −15 and 15 by fabrication constraints and neutron source parameters. In some embodiments, the groove height induces a phase shift that manifests into an observable signal, preferably a height that induces the desired phase shift (e.g., π/2 or π) at the particular neutron setup. In some embodiments, the desired phase shift can be relatively small, e.g., <<2π whereas in other embodiments the phase shift may be π/2 or π.

Depending on the term $$\frac{2\pi}{p}$$

or equation (1), the azimuthal angle at which the structured wavefronts are diffracted can be modified. Therefore, modifying the phase grating period (p) can in turn increase or decrease the divergence of the structured wavefronts relative to the zero order neutron beam which remains undeflected by the array of phase gratings. For instance, by modifying the period p, one can decide whether the structured wave propagates at a given divergence angle. More specifically, the phase grating period can range from nanometers to micrometers.

Further, it is noted that the term f(x,y) of equation (1) can dictate the type of structured wave that can be obtained in far field. For instance, by modifying the term f(x,y) to be a helical gradient, a conical gradient, or a cubic gradient profile or other phase profiles that can redirect, focus, and/or compensate neutron beams deviation and propagation, one can decide whether the structured wave is an OAM beam, an Airy beam, a Bessel beam, and/or a different type of structured wave. More specifically, the term f(x,y) can be qϕ for an OAM beam of OAM value of ±q, the term f(x,y) can be $c\cdot(x^3+y^3)$ for an Airy beam, the term f(x,y) can be $c\cdot\sqrt{x^2+y^2}$ for a Bessel beam, and so on. In some embodiments, the structured wave has a zero order beam, and higher-order order beams propagating at a non-zero angle relative to the propagation axis of the neutron beam.

As shown in this embodiment, the propagation axis 106 of the neutron beam 104 is perpendicular to the substrate 110. However, in some other embodiments, the propagation axis 106 of the neutron beam 104 can impinge in an oblique manner on the substrate. As depicted, the structured wave generator 100 is provided in the form of a transmission configuration. In this embodiment, the substrate and phase gratings are made of one or more materials that are transparent to the neutron beam. In some other embodiments, the structured wave generator can be provided in the form of a reflection configuration, with the propagation axis of the neutron beams impinging obliquely onto the array of phase gratings. When the substrate 110 is provided alone, it can act as a device 110' for diffracting neutron beams into structured waves.

Example—Experimental Realization of Neutron Helical Waves

Despite the proven power of neutrons for material characterization and studies of fundamental physics, neutron science has not been able to fully integrate such techniques due to small transverse coherence lengths, the relatively poor resolution of spatial detectors, and low fluence rates. In this example, methods and systems are demonstrated to be practical with the existing technologies, and show the experimental achievement of neutron helical wavefronts that carry well-defined OAM values. Other types of structured waves such as Airy beams and Bessel beams can also be formed. Such applications to neutron beams having structured wavefronts can include spin-orbit correlations and material characterization techniques.

More specifically, a holographic approach to tuning of neutron OAM is demonstrated in this example. Microfabricated arrays of millions of diffraction gratings are provided, with critical dimensions comparable to neutron coherence lengths. As discussed below, the evolution of the neutron wave packets from micrometer to decimeter length scales are followed and studied. The arrays can be laid out on the cm-square areas typical of usual neutron scattering targets. This can suggest possibilities for the direct integration of other structured wave techniques, such as the generation of Airy and Bessel beams, into neutron sciences. Furthermore, applications towards characterization of materials, helical neutron interactions, and spin-obit correlations, are discussed.

Phase-gratings with q-fold fork-dislocations have been used in optics to produce photons with OAM=qm at the $m^{th}$ order of diffraction. This can require that the coherence length of the light beam be comparable to the dimensions of the fork-dislocation grating.

Neutron beams can have lateral coherence lengths in the order of microns and fluence rates of $10^5$-$10^7$ neutrons/($cm^2\times s$). Observing the neutron signal from a single micron sized target is impractical. However, the signal can be multiplied by using an N×N lattice of micron-sized fork-dislocation gratings. It follows that the measured signal is obtained from the integral over the individual gratings whose separation distance and size is much smaller than the signal of interest.

Figure 2A:
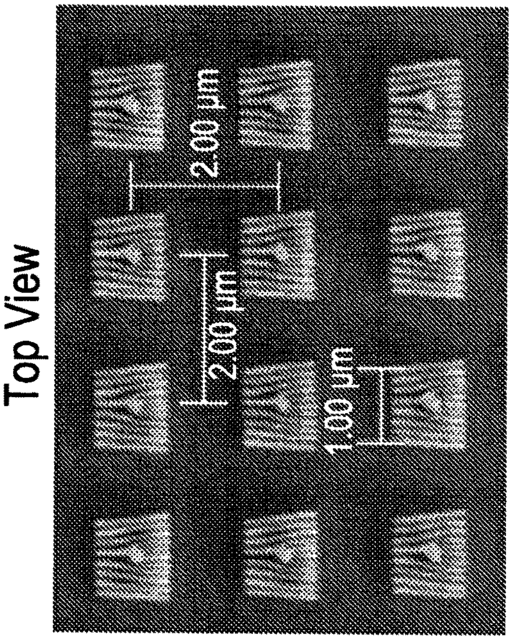
FIG. 2A is a top plan view of the array of phase gratings of FIG. 1, with a topological charge q of 3, in accordance with one or more embodiments.
Figure 2B:
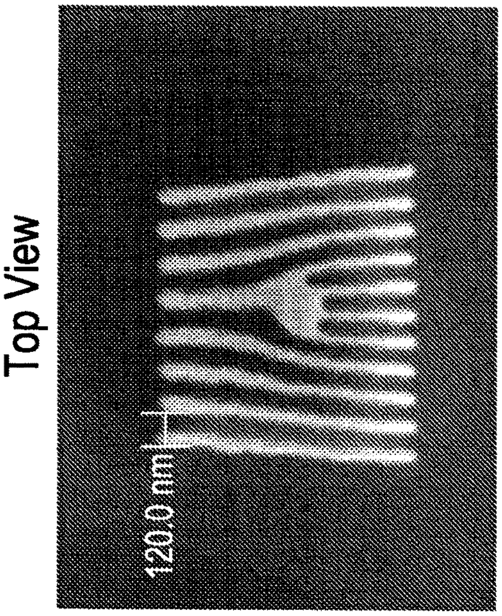
FIG. 2B is an enlarged view of FIG. 2A, showing an individual phase grating.
Figure 2C:
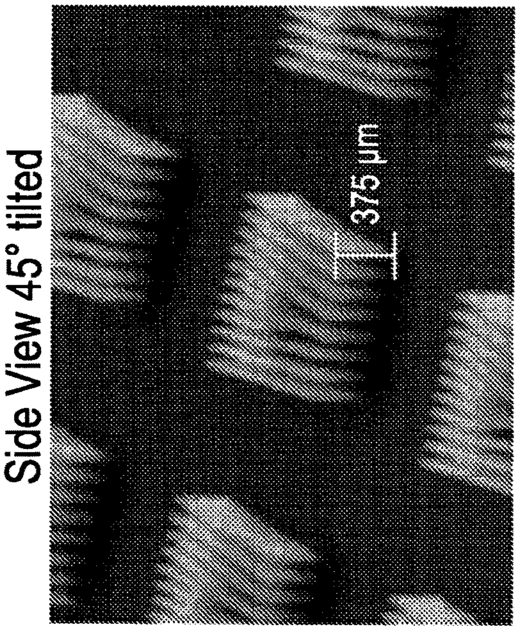
FIG. 2C is an oblique view of the individual phase grating of FIG. 2B.

Such arrays were fabricated on silicon substrates using electron beam lithography. FIGS. 2A-C show scanning electron microscope (SEM) images of phase gratings with q=3 in an array with N=2500. By construction, the spatial dimensions of the phase gratings are comparable to the coherence length $\sigma_\perp$ of the neutron beam. More specifically, FIGS. 2A-2C show SEM images characterizing the 2D array of fork dislocation phase gratings with topology q=3, in accordance with a first embodiment. FIGS. 2A and 2B are top plan views whereas FIG. 2C is an oblique view from a 45 degrees tilt. As shown, the array of 6,250,000 individual 1 μm by 1 μm fork dislocation phase-gratings covered a 0.5 cm by 0.5 cm area Each phase grating possessed a grating period p of 120 nm, height h of 500 nm, and were separated by 1 μm on each side from the other phase gratings. The use of such an array increases the neutron intensity by $N^2$ in a given m>0 diffraction order in the far-field, as shown in FIG. 1. It was found that each phase-grating with a fork dislocation generates a diffraction spectra consisting of diffraction orders (m) that carry a well-defined OAM value of $l=m\hbar q$.

Figure 3A:
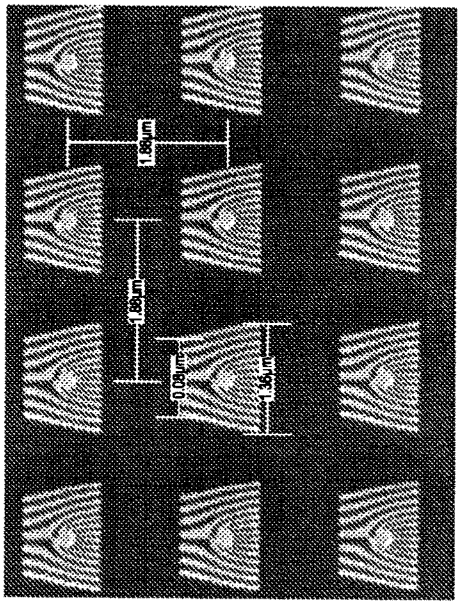
FIG. 3A is a top plan view of an example array of phase grating, with a topological charge q of 7, in accordance with one or more embodiments.
Figure 3B:
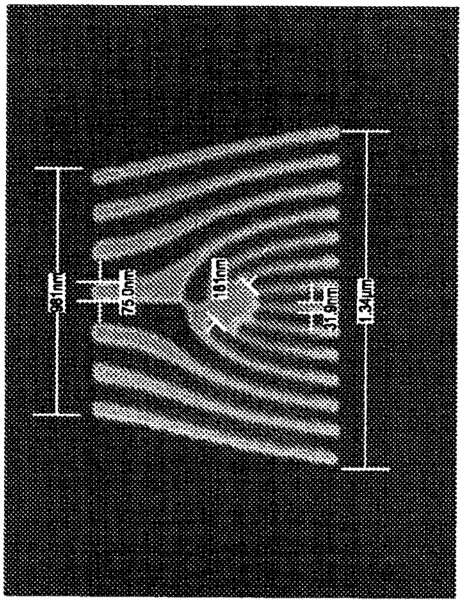
FIG. 3B is an enlarged view of FIG. 3A, showing an individual phase grating.
Figure 3C:
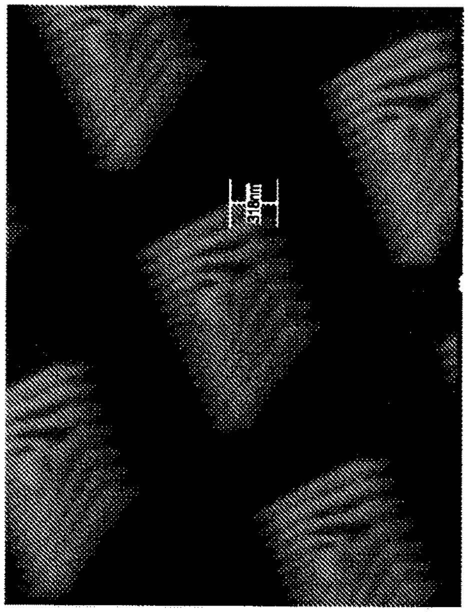
FIG. 3C is an oblique view of the individual phase grating of FIG. 3B.

FIGS. 3A-3C show SEM characterization of the 2D fork dislocation phase-grating array with topology q=7, in accordance with a second embodiment. FIGS. 3A and 3B are top plan views whereas FIG. 3C is an oblique view from a 45 degrees tilt. The array of 6,250,000 individual 1 μm by 1 μm fork dislocation phase-gratings covered a 0.5 cm by 0.5 cm area Each grating possessed a grating period p of 120 nm, height h of 400 nm, and were separated by 1 μm on each side from the other phase gratings.

The periodic arrangement of the individual phase gratings is large enough not to be observable in the given experimental setup. The individual diffraction orders in the presented intensity profiles span an area of ≈10 cm by 10 cm, were taken over a period of ≈40 min, and consist of the signal from the 6,250,000 individual fork dislocation phase-gratings.

To characterize the generated OAM states the momentum distribution was mapped out. Small Angle Neutron Scattering (SANS) beamlines provide several advantages as they can map the spatial profiles in the far-field, where the observed intensity distribution is directly determined by the Fourier transform of the outgoing neutron wavefunction. Having access to the far-field enables the use of holographic techniques that have been developed for optical structured waves. Another advantage is the relatively large flux and the accessibility to a wide range of wavelengths. And lastly, it is the typical setup used in material characterization techniques including the contemporary techniques analyzing skyrmion and topological geometries. Straight-forward extensions follow for incorporating the characterization of materials and performing experiments with helical neutron interactions.

The intensity in the far-field of a neutron that passes on-axis through a phase-grating with a fork dislocation can be determined by:

$$\mathcal{F}\{\psi_{in}e^{iF(x)}\} = \mathcal{F}\left\{\psi_{in}\left[\cos\left(\frac{\alpha}{2}\right) + \sin\left(\frac{\alpha}{2}\right)\sum_m \frac{2}{m\pi} e^{i\frac{2\pi m x}{p}} e^{imq\phi}\right]\right\}, \tag{2}$$

where x (ϕ) is the Cartesian (azimuthal) coordinate, p is the grating period, m= . . . −3, −1,1,3 . . . are the non-zero diffraction orders, α is the induced phase by the grating grooves, $\mathcal{F}\{\ \}$ is the Fourier transform, F[x] is the grating profile, and the incoming wavefunction $\psi_{in}$ is typically taken to be a Gaussian profile for convenience. The far-field is defined to be the distance at which the diffraction orders are spatially separated, so here the m terms are considered independently along their respective propagation directions. Well-defined OAM states were thus obtained in the form of $\psi_{in}e^{imq\phi}$. Consider the first diffraction order of a single neutron wavepacket that transverses on-axis with the fork dislocation of a single phase-grating. Each point ($r_0$, $\phi_0$) in the neutron wavepacket is diffracted along the transverse direction, such that the induced OAM relative to the axis of propagation is independent of the point's location.

A simple map for modelling the action of a binary phase-grating with a fork dislocation can be expressed as:

$$\psi_{in} \to \psi_{in}\left[\cos\left(\frac{\alpha}{2}\right) + \sin\left(\frac{\alpha}{2}\right)\sum_m \frac{2}{m\pi} e^{i\frac{2\pi m x}{p}} e^{imq\phi}\right], \quad (3)$$

where x ($\phi$) is the Cartesian (azimuthal) coordinate, p is the grating period, m= . . . −3, −1,1,3 . . . are the non-zero diffraction orders, $\alpha$ is the induced phase by the height of the grating grooves, and the incoming wavefunction $\psi_{in}$ is typically taken to be a Gaussian profile for convenience. The far-field is typically defined to be the distance at which the diffraction orders are spatially separated, so here the m terms are considered independently along their respective propagation directions. Well-defined OAM states are thus obtained in the form of $\psi_{in}e^{imq\phi}$. Consider one diffraction order of a single neutron wavepacket that transverses on-axis with the fork dislocation of a single phase-grating. Each point ($r_0$, $\phi_0$) in the neutron wavepacket is diffracted along the transverse direction, such that the induced OAM relative to the axis of propagation is independent of the point's location:

$$\ell = |\vec{r} \times \vec{p}| = r_0 \hbar k_\perp = \hbar q, \quad (4)$$

where $\vec{p}$ is the neutron momentum, $k_\perp$ is the magnitude of the wavevector along the $\phi$ direction, and $\hbar$ is the reduced Planck's constant. Therefore, every part of the neutron wave packet obtains a well-defined OAM of $l=\hbar q$.

With equal transverse coherence lengths $\sigma_x=\sigma_y=\sigma_\perp$, the cylindrical symmetry is used to describe the transverse wave function in terms of solutions to the 2-D harmonic oscillator:

$$\psi_{\ell,n_r}(r, \phi) = \mathcal{N}\left(\frac{r}{\sigma_\perp}\right)^{|\ell|} e^{-\frac{r^2}{2\sigma_\perp^2}} \mathcal{L}_{n_r}^{|\ell|}\left(\frac{r^2}{\sigma_\perp^2}\right) e^{i\ell\phi}, \quad (5)$$

where $$\mathcal{N} = \frac{1}{\sigma_\perp}\sqrt{\frac{n_r!}{\pi(n_r + |\ell|)!}}$$

is the normalization constant, $n_r$ ε(0, 1, 2 . . . ), $\ell \in$ (0, ±1, ±2 . . . ), and $$\mathcal{L}_{n_r}^{|\ell|}(r^2/\sigma_\perp^2)$$

are the associated Laguerre polynomials. The corresponding neutron energy is:

$$E = \hbar\omega_\perp(2n_r + |\ell| + 1), \quad (6)$$

where $$\omega_\perp^2 = \hbar / (2M\sigma_\perp^2),$$

and M is the mass of the neutron. Each diffraction order m of the fork dislocation phase-grating is in a definite state of OAM:

$$\psi = \sum_{n_r} \psi_{\ell=mq,n_r}. \quad (7)$$

Considering $n_r=0$ dominant term of the first diffraction order, we can determine that the azimuthally integrated intensity:

$$\int_0^{2\pi} |\psi_{q,0}(r_0, \phi_0)|^2 d\phi, \quad (8)$$

peaks at:

$$r_0 = \sigma_\perp \sqrt{q}. \quad (9)$$

The experiments were performed on the GP-SANS beamline at the High Flux Isotope Reactor at Oak Ridge National Laboratory®. A circular aperture of s=20 mm diameter is used to define symmetric transverse coherence lengths $\sigma_x=\sigma_y=\sigma_\perp$. With the aperture to sample distance of $L_1$=17.8 m and neutron wavelength of $\lambda$=12 Å, the transverse coherence length of the neutron wavepacket was set to the size of one fork dislocation phase-grating $\sigma_\perp \approx \lambda L_1/s \approx 1$ μm. The distance between the sample and the camera was 19 m, and the camera size span an area of ≈1 $m^2$ with each pixel being ≈5.5 mm by 4.1 mm in size. Two arrays of fork dislocation phase-gratings were fabricated on Si wafers. Small-angle neutron scattering measurements were performed on the GP-SANS beamline at the High Flux Isotope Reactor at Oak Ridge National Laboratory®. The fork dislocation phase-gratings were placed inside a ThorLabs® rotation mount (pat number RSP2D) which was then affixed to the end of the sample aperture holder. The gratings were placed 17.8 m away from the 20 mm diameter source aperture. A 4 mm diameter sample aperture was placed right in front of the sample to reduce possible background. The distance from the grating to the camera was 19 m, and a wavelength distribution of $\delta\lambda/\lambda$=10% and a central wavelength of 12 Å. The resulting standard deviation of the resolution distribution was estimated as $\sigma_{Qx}$=0.0001645 Å.

The target parameters for the fork dislocation phase-gratings were: period: p=120 nm for both q=3 and q=7, groove height of h=500 (400) nm for q=3 (q=7), and inner region diameter 200 nm for both q=3 and q=7. These parameters were experimentally optimized to ensure that we obtain high quality and robust structures.

Double-side polished, intrinsic, 2 inch diameter (100) silicon wafers were used to fabricate the arrays of fork dislocation phase-gratings. Electron beam lithography (EBL) was employed to pattern the high performance positive EB resists (ZEP520A, ≈80 nm). The e-beam exposure was carried out with a JEOL® JBX-6300FS EBL system operating at 100 kV and 2 nA beam current. The e-beam dosage was 250 $\mu C/cm^2$. After the e-beam exposure, the sample was processed in the developer ZED-N50 for 90 s, and then immersed in IPA for 60 s followed by a pure nitrogen dry. As hard mask during plasma etching of Si, Chromium (Cr) metal (20 nm) was e-beam evaporated and lifted-off in heated PG Remover. A pseudo-Bosch recipe was adopted to achieve vertical sidewall etch profile. The samples were etched in an Oxford® PlasmaLab™ ICP-380 inductively coupled plasma reactive ion etching (ICP-RIE) system, which provides high-density plasma with independently controlled system parameters. The recipe includes rf: 100 W, ICP: 1200 W, $C_4F_8$: 25 sccm, $SF_6$: 15 sccm, pressure: 10 mTorr, temperature: 20 C. After fabricating the array of fork dislocation phase-gratings, the remaining Cr etch mask was removed via plasma etching.

Figure 4C:
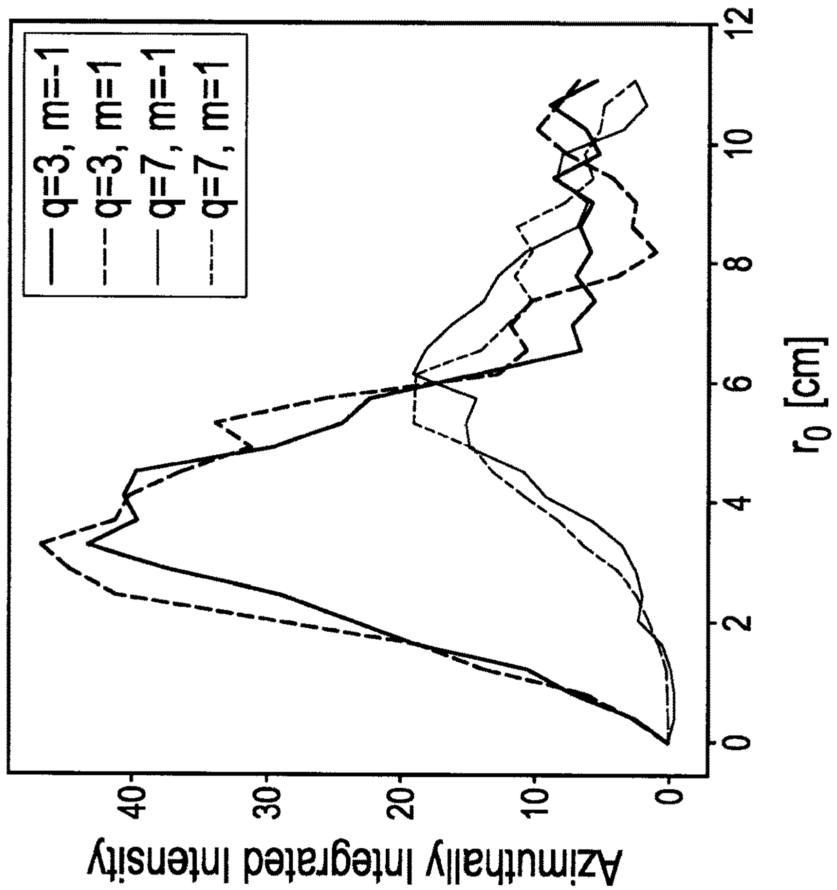
FIG. 4C is a graph showing azimuthally integrated intensity profiles across the diffraction orders for the structured waves of FIGS. 4A and 4B.
Figure 4A:
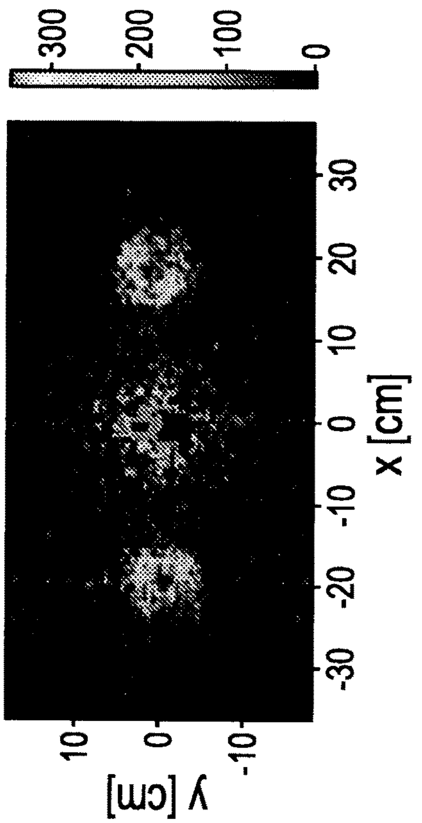
FIG. 4A a plot showing small-angle neutron scattering (SANS) data measured for a structured wave obtained using the array of FIG. 2A.

The observed SANS data for the two arrays of fork dislocation phase-gratings is shown in FIG. 4A. With the phase-grating period of p=120 nm, the angle of divergence of the first diffraction order is $\theta \approx \lambda/p \approx 0.01$ rad which corresponds to $Q_x = 2\pi/p = 0.00525$ on the SANS images. In this particular setup, this corresponds to a spatial distance of x=19 cm on the neutron camera. Good agreement is found with the observed location of the peaks. The SANS data shows that the (−1, 0, 1) diffraction orders are visible, and the corresponding doughnut profiles induced by the helical wavefronts can be observed. The measurement time for q=3 was 40 min and for the q=7 was 60 min.

FIG. 4C shows the azimuthally integrated intensity profiles across the diffraction orders characterizing the size of the doughnut profiles. The point $r_0=0$ corresponds to the center of the diffraction order, and the location of the expected peak of the doughnut profile is given by Eq. 9. To quantify the doughnut profiles, one can analyze the azimuthally integrated intensity (as per Eq. 8) centered on the first diffraction orders. As per Eq. 9, the expected doughnut size varies with $\sqrt{q}$, which is in good agreement with the observed data.

This example thus presents a method to generate and characterize neutron helical waves, or other neutron beams having different structured wavefronts, that are dominated by a well-defined OAM value. The presented method can open the door for the implementation of other structured wave techniques with neutrons, such as the generation of "self-accelerating" Airy beams, as well as the "non-diffractive" Bessel beam. These beams possess a "self-healing" property as they can reform after being partially obstructed. Considering an array of phase-gratings, the Airy beams would be generated through the addition of a cubic phase gradient while the Bessel beams through the addition of a radial phase gradient.

The convenient integration with a SANS beamline provides access to the far-field where the helical beams with specific OAM values are separated in the form of diffraction orders. This enables studies of interactions between neutron's helical degree of freedom and scattering from materials. For example, placing the fork array phase-grating before a topological sample and post-selecting the analysis on individual diffraction orders allows for direct study of scattering properties from neutron helical waves.

Another avenue of exploration that is made possible is the experimental investigation of neutron selection rules. For example, this may be achieved through the addition of $^3$He spin filters. The absorption of neutrons by nuclear spin-polarized $^3$He is strongly dependant on the spin orientation of the neutron due to the conservation of spin angular momentum. The proposed method allows for the direct tests at a SANS beamline through the characterization of the diffraction peaks after the post-selection via $^3$He cell polarizers.

A 50% duty cycle phase-grating with a fork dislocation has the following profile:

$$F(x) = \frac{\alpha}{2}\text{sign}\left(\sin\left[\frac{2\pi}{p}x + q\phi\right]\right), \tag{10}$$

where p is grating period, q is the topological charge, x is the Cartesian coordinate, and $\phi$ is the azimuthal coordinate. The groove height h sets the phase shift that is induced by each grating groove: $\alpha = -Nb_c\lambda h$ where $Nb_c$ is the coherent scattering length density of the grating material and $\lambda$ is the neutron wavelength. As per Eq. 3 we can see that a determines the relative amplitudes of the diffraction orders. For example, for $\alpha=\pi$ the zeroth order is suppressed while for $\alpha=\pi/2$ there is an equal amount of zeroth order and the higher orders. Note that the fabrication of the small periods currently limits us to small $\alpha$, and hence we will not be considering these effects. The only consideration is given to minimizing the acquisition time by maximizing the height h to increase the number of neutrons in the first diffraction order.

The resulting profile for q=3 is shown in FIG. 2A. The period p determines the angle of propagation of the diffraction orders, and hence it needs to be set by the requirements of the given beamline. The angle of propagation of the first diffraction order is:

$$\theta = \sin^{-1}\left(\frac{\lambda}{p}\right) \approx \frac{\lambda}{p} \approx \frac{\lambda Q_G}{2\pi}, \tag{11}$$

where $Q_G=2\pi/p$ is the scattering vector of the gratings.

The topological charge q sets the OAM values carried by the diffraction orders. As depicted on FIG. 2A, q is the difference between the number of periods along the grating direction above the origin when compared to the number below the origin.

It is important to note that the fabrication challenges of the central region of the ideal fork dislocation phase-grating are typically overcome through the omission of the central region. Accordingly, a flat circular profile with diameter ≈200 nm was intentionally imposed in the designs, which can be observed in the SEM figures. This is a common practice in optical OAM techniques given that the effects of such a feature are negligible in diffraction as the beam diverges away from the center.

Figure 4B:
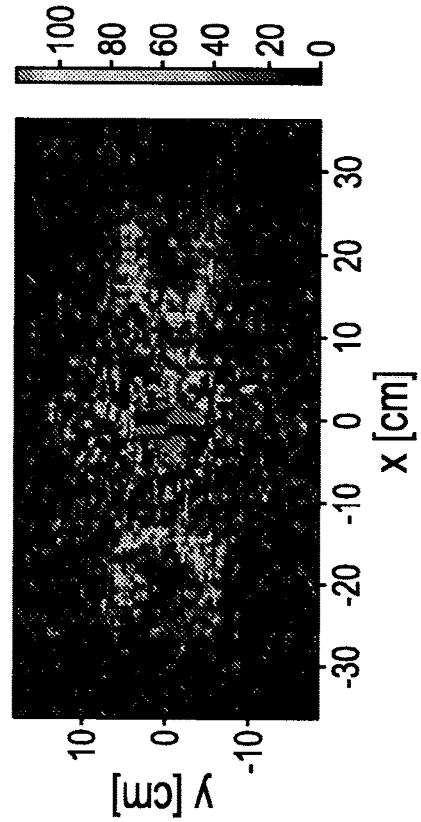
FIG. 4B is a plot showing SANS data measured for a structured wave obtained using the array of FIG. 3A.

Lastly the purpose of creating an array of these structures is two-fold. The first is that by creating the array with identical copies we are able to increase the signal to measurable amounts. Note that the spacing between the individual fork dislocation phase-gratings is 1 μm over the 0.5 cm by 0.5 cm area, whereas the diameter of the ring in the first diffraction order is several centimeters. Hence the measured signal is the integral over the positions of the individual gratings whose separation distance and size is much smaller than the signal of interest. The q=3 and q=7 SANS data shown in FIGS. 4A and 4B were taken over 40 min and consist of the signal from millions of fork dislocation phase-gratings. Therefore, it is not practical to measure the signal of a single such grating. The second advantage is that future studies with materials are conveniently integratable with this design. A topological material typically possesses an array of topologies and hence it is desirable to create a tool with similar properties for more specific characterization.

As can be understood, the examples described above and illustrated are intended to be exemplary only. For instance, the neutron source can be omitted in some embodiments. In these embodiments, the substrate encompassing the array of phase gratings such as described above can be provided in the form of a device for diffracting a neutron beam into a structured wave. The features of the phase gratings of the array can be made from a material that attenuates/strongly absorbs neutrons, and/or from a material that induces a phase shift. Although the phase gratings described above with reference to the figures are fork dislocation phase gratings, other types of phase gratings can be used in some other embodiments. Moreover, the structured wave outputted from the substrate can be have uses in near-field, in far-field or a combination of both. The scope is indicated by the appended claims.

What is claimed is:

1. A structured wave generator comprising:

a neutron source generating a neutron beam having a propagation axis and a lateral coherence length extending perpendicular to the propagation axis; and a substrate spaced-apart from the neutron source, the substrate having an array of phase gratings distributed on the substrate for receiving the neutron beam, the phase gratings having a body made of a grating material and having a holographic profile, the holographic profile having an in-plane dimension being equal or smaller than the lateral coherence length of the neutron beam, wherein when the neutron beam interacts with the array of phase gratings, at least a portion of the neutron beam diffracts to form a structured wave.

2. The structured wave generator of claim 1 wherein the in-plane dimension of the holographic profile ranges between 0.1 μm and 5 μm.

3. The structured wave generator of claim 1 wherein the lateral coherence length of the neutron beam ranges between 0.1 μm and 5 μm.

4. The structured wave generator of claim 1 wherein the holographic profile is defined by an equation equivalent to the following equation:

$$F(x, y) = A\ \mathrm{sign}\left(\sin\left[\frac{2\pi}{p}x + f(x, y)\right]\right),$$

with F(x, y) denoting the holographic profile, x and y denoting Cartesian coordinates along in-plane axes of the substrate, A denoting a constant factoring in at least on a neutron wavelength λ and groove height h, p denoting a grating period, and f(x, y) denoting a desired structured wavefront.

5. The structured wave generator of claim 4 wherein the groove height ranges between 50 nm and 1 μm.

6. The structured wave generator of claim 1 wherein the propagation axis is perpendicular to the substrate.

7. The structured wave generator of claim 1 wherein the neutron beam interacting with the array of phase gratings includes the neutron beam propagating through the array of phase gratings.

8. The structured wave generator of claim 1 wherein the structured wave is at least one of an orbital angular momentum beam, a Bessel beam and a Airy beam.

9. The structured wave generator of claim 1 wherein the structured wave has a zero order beam, and higher-order order beams propagating at a non-zero angle relative to the propagation axis of the neutron beam.

10. The structured wave generator of claim 1 wherein the substrate and array of phase gratings are made of a silicon-based material.

11. The structured wave generator of claim 1 wherein the array of phase gratings includes at least 100,000 phase gratings.

12. The structured wave generator of claim 1 further comprising a neutron detector positioned in far field relative to the array of phase gratings.

13. A device for diffracting a neutron beam into a structured wave, the neutron beam having a propagating axis and a lateral coherence length extending perpendicular to the propagation axis, the device comprising: a substrate having an array of phase gratings distributed on the substrate for receiving the neutron beam, the phase gratings having a body made of a grating material and having a holographic profile, the holographic profile having an in-plane dimension being equal or smaller than the lateral coherence length of the neutron beam, wherein when the neutron beam interacts with the array of phase gratings, at least a portion of the neutron beam diffracts to form the structured wave.

14. The device of claim 13 wherein the in-plane dimension of the holographic profile ranges between 0.1 μm and 5 μm.

15. The device of claim 13 wherein the lateral coherence length of the neutron beam ranges between 0.1 μm and 5 μm.

16. The device of claim 13 wherein the holographic profile is defined by an equation equivalent to the following equation:

$$F(x, y) = A\ \mathrm{sign}\left(\sin\left[\frac{2\pi}{p}x + f(x, y)\right]\right),$$

with F(x, y) denoting the holographic profile, x and y denoting Cartesian coordinates along in-plane axes of the substrate, A denoting a constant factoring in at least on a neutron wavelength λ and groove height h, p denoting a grating period, and f(x, y) denoting a desired structured wavefront.

17. The device of claim 16 wherein the desired structured wavefront f(x, y) is given by qϕ where q denotes a topological charge and ϕ denotes an azimuthal angle.

18. The device of claim 16 wherein the groove height ranges between 50 nm and 1 μm.

19. The device of claim 13 wherein the substrate and array of phase gratings are made of a silicon-based material.

20. The device of claim 13 wherein the array of phase gratings includes at least 100,000 phase gratings.

* * * * *